United States Patent
Chen

(10) Patent No.: US 8,446,921 B2
(45) Date of Patent: May 21, 2013

(54) SERIAL BUS DEVICE AND CLOCK DIFFERENCE COMPENSATION METHOD THEREOF

(75) Inventor: Shih-Hau Chen, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 414 days.

(21) Appl. No.: 12/776,530

(22) Filed: May 10, 2010

(65) Prior Publication Data
US 2011/0158261 A1    Jun. 30, 2011

(30) Foreign Application Priority Data
Dec. 31, 2009  (TW) ................. 98146396 A

(51) Int. Cl.
*H04J 3/06* (2006.01)
(52) U.S. Cl.
USPC ........... 370/503; 370/522; 370/545; 375/371; 710/33; 710/65
(58) Field of Classification Search
None
See application file for complete search history.

(56) References Cited

U.S. PATENT DOCUMENTS

| 8,161,210 | B1 * | 4/2012 | Norrie | 710/65 |
|---|---|---|---|---|
| 2003/0103253 | A1 * | 6/2003 | Bunton | 359/123 |
| 2007/0177701 | A1 * | 8/2007 | Thanigasalam | 375/372 |
| 2009/0086874 | A1 * | 4/2009 | Wang et al. | 375/372 |
| 2010/0085873 | A1 * | 4/2010 | Moons | 370/230 |
| 2010/0316068 | A1 * | 12/2010 | Ornes et al. | 370/476 |

FOREIGN PATENT DOCUMENTS

JP    2009-289292    12/2009

OTHER PUBLICATIONS

Japanese language office action dated Dec. 30, 2010.
English language translation of abstract of JP 2009-289292 (published Dec. 10, 2009).
"Universal Serial Bus 3.0 Specification;" Nov. 12, 2008; p. 6-11.

* cited by examiner

*Primary Examiner* — Chi Pham
*Assistant Examiner* — Shick Hom
(74) *Attorney, Agent, or Firm* — McClure, Qualey & Rodack, LLP

(57) ABSTRACT

A serial bus device for transmitting a packet to a link partner is provided. The serial bus device includes a processing unit and a clock difference compensation unit coupled to the processing unit. The processing unit generates the packet. The clock difference compensation unit determines whether to transmit at least one skip ordered set to the link partner prior to the packet according to a type of the packet, so as to compensate for a clock difference for the link partner.

15 Claims, 6 Drawing Sheets

| Value | Type |
|---|---|
| 00000 | Link Management Packet (LMP) |
| 00100 | Transaction Packet (TP) |
| 01000 | Data Packet (DP) |
| 01100 | Isochronous Timestamp Packet (ITP) |

FIG. 3

| Data Length of Data Packet | Quantity of Skip Ordered Set |
|---|---|
| 0 ~ 511 | 0 |
| 512 ~ 767 | 1 |
| 768 ~ 1024 | 2 |

FIG. 5

SERIAL BUS DEVICE AND CLOCK DIFFERENCE COMPENSATION METHOD THEREOF

CROSS REFERENCE TO RELATED APPLICATIONS

This application claims priority of Taiwan Patent Application No. 098146396, filed on Dec. 31, 2009, the entirety of which is incorporated by reference herein.

BACKGROUND OF THE INVENTION

1. Field of the Invention

The invention relates to a serial bus device, and more particularly to a serial bus device for clock difference compensation.

2. Description of the Related Art

A Universal Serial Bus (USB) is a serial bus standard for connection of an external apparatus, which provides hot plug, plug and play and other related functions.

Currently, the USB 2.0 standard provides three transfer rates: low-speed; full-speed; and high-speed transfer rates, which support: 1.5 Mbps; 12 Mbps; and 480 Mbps data rates, respectively. However, even faster transfer rates are being demanded for electronic apparatuses, due to continued advanced technological development, so that the electronic apparatuses may quickly access data from external apparatuses and subsequently perform related operations.

Therefore, the USB Implementers Forum established a next generation USB industry-standard, the USB 3.0. The USB 3.0 standard allows employment of SuperSpeed data transfer and non-SuperSpeed (i.e. USB 2.0) data transfer simultaneously, wherein SuperSpeed data transfer supports up to a 5 Gbps data rate.

BRIEF SUMMARY OF THE INVENTION

A serial bus device and a clock difference compensation method thereof are provided. An embodiment of a serial bus device for transmitting a packet to a link partner is provided. The serial bus device includes a processing unit and a clock difference compensation unit coupled to the processing unit. The processing unit generates the packet. The clock difference compensation unit determines whether to transmit at least one skip ordered set to the link partner prior to the packet according to a type of the packet, so as to compensate for a clock difference for the link partner.

Furthermore, an embodiment of a clock difference compensation method for a serial bus device is provided. It is determined whether a packet to be transmitted to a link partner is a data packet. When the packet is the data packet and a data length of the packet is larger than or equal to a specific value, at least one skip ordered set is transmitted to the link partner prior to the packet, so as to compensate for a clock difference between the serial bus device and the link partner.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 3 shows a Type field table illustrating the content values of various types of packets, which conform to the USB 3.0 specification;

FIG. 5 shows a table illustrating a relationship between a data length of a Data Packet and a quantity of the skip ordered set inserted by a skip symbol generator according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
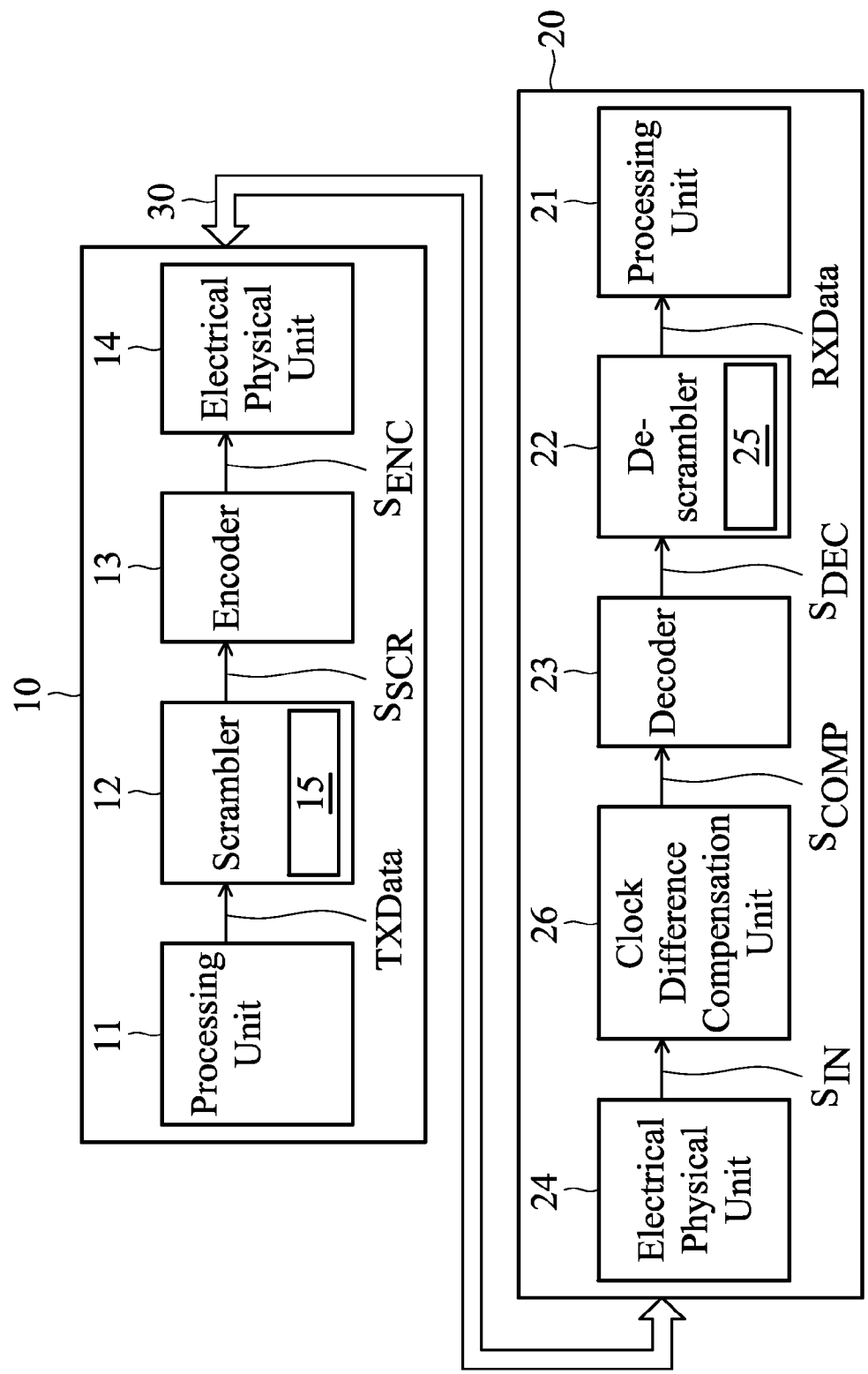
FIG. 1 shows a schematic illustrating SuperSpeed data communications between two Universal Serial Bus (USB) devices.

FIG. 1 shows a schematic illustrating SuperSpeed data communications between two Universal Serial Bus (USB) devices 10 and 20. In FIG. 1, the USB device 10 transmits data to the USB device 20 via a cable 30, wherein the USB devices 10 and 20 are link partners on the transmitting and receiving sides, respectively. The link partner 10 includes a processing unit 11, a scrambler 12, an encoder 13 and an electrical physical unit 14, wherein the scrambler 12 includes a linear feedback shifter register 15. First, the processing unit 11 provides raw data TXData to be transmitted to the scrambler 12, wherein a length of the data TXData is 8 bits. Next, the scrambler 12 scrambles the data TXData to generate scrambled data $S_{SCR}$ according to a seed provided by the linear feedback shifter register 15. Next, the encoder 13 encodes the scrambled data $S_{SCR}$ to generate encoded data $S_{ENC}$ and then transmits the encoded data $S_{ENC}$ to the electrical physical unit 14. The encoder 13 encodes the scrambled data $S_{SCR}$ using an 8b/10b encoding technique. Thus, the encoded data $S_{ENC}$ is a symbol with a 10-bit length. Next, the electrical physical unit 14 transforms the encoded data $S_{ENC}$ from parallel to serial form and then transmits the encoded data $S_{ENC}$ to the link partner 20 via the cable 30. The electrical physical unit 14 is an input/output interface unit which receives and transmits the differential signals that conform to the USB standard.

Referring to FIG. 1, the link partner 20 includes a processing unit 21, a de-scrambler 22, a decoder 23, a clock difference compensation unit 26 and an electrical physical unit 24, wherein the de-scrambler 22 includes a linear feedback shifter register 25. When a series of bit data (or bit data stream) from the link partner 10 is received by the link partner 20, the electrical physical unit 24 transforms the received bit data from a serial to a parallel form to generate a symbol string comprising a plurality of input data $S_{IN}$, wherein each input data $S_{IN}$ is a symbol with a 10-bit length. Next, the clock difference compensation unit 26 determines whether a compensation procedure is required to be performed or not according to a clock difference between a first clock of the link partner 20 and a second clock of the link partner 10, so as to synchronize the transmitted data rate of the link partner 10 and the received data rate of the link partner 20. When the clock difference between the first and second clocks is small, the clock difference compensation unit 26 directly passes the input data $S_{IN}$ to the decoder 23 without performing a compensation procedure, i.e. the data $S_{COMP}$ is identical to the $S_{IN}$. Therefore, the data $S_{COMP}$ of the link partner 20 is identical to the encoded data $S_{ENC}$ of the link partner 10 when there is no distortion between the data communication of the two link partners 10 and 20. Next, the decoder 23 decodes the data $S_{COMP}$ using an 8b/10b decoding technique to generate data $S_{DEC}$. Meanwhile, the decoded data $S_{DEC}$ of the link partner 20 is identical to the data $S_{SCR}$ of the link partner 10 when the data communication between the two link partners 10 and 20 is correct. Next, the de-scrambler 22 de-scrambles the decoded data $S_{DEC}$ according to a seed provided by the linear feedback shifter register 25 to generate the data RXData and transmits the data RXData to the processing unit 21 for subsequent applications of the processing unit 21.

Figure 2:
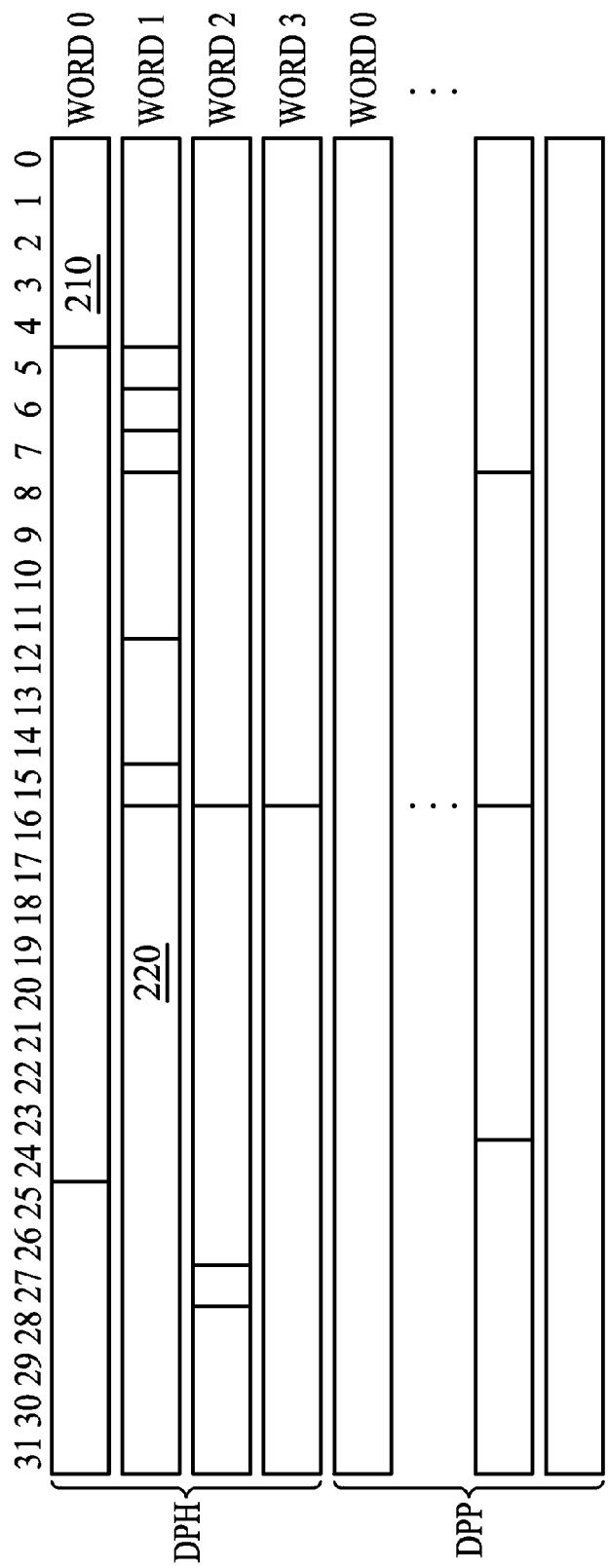
FIG. 2 shows a format of a Data Packet which conforms to the USB 3.0 specification.

In the USB 3.0 specification, SuperSpeed data transfer includes four basic types of packets: Link Management Packet (LMP), Transaction Packet (TP), Data Packet (DP), and Isochronous Timestamp Packet (ITP). A Transaction Packet does not have a data payload. A Data Packet includes a Data Packet Header (DPH) and a Data Packet Payload (DPP), as shown in FIG. 2 illustrating a format of a Data Packet which conforms to the USB 3.0 specification. In the USB 3.0 specification, each SuperSpeed header starts with a Type field that is a 5-bit field, e.g. the field 210 of FIG. 2, which is used to identify the format of the SuperSpeed packet, so as to determine how the SuperSpeed packet is to be used or forwarded. FIG. 3 shows a Type field table illustrating the content values of various types of packets, which conform to the USB 3.0 specification, wherein the content values are represented with binary-coded. In FIG. 3, the content value of Link Management Packet is "00000", the content value of Transaction Packet is "00100", the content value of Data Packet is "01000", and the content value of Isochronous Timestamp Packet is "01100".

Referring back to FIG. 1, according to the USB 3.0 specification, the link partner 10 will transmit one skip ordered set to the link partner 20 at an average of every 354 symbols, so as to compensate for a clock difference (or different bit rates) between the two link partners 10 and 20. In the USB 3.0 specification, a skip ordered set (or so-called SKP ordered set) includes two skip symbols. For example, a first skip symbol is "0011111001" and a second skip symbol is "1100000110", or a first skip symbol is "1100000110" and a second skip symbol is "0011111001". It is to be noted that a high capacity file will be divided into a plurality of data packets, and no skip ordered set is inserted within any data packet but may be inserted into an interval between two adjacent data packets. Thus, the link partner 10 is allowed to buffer the skip ordered sets during data packet communications. After the data packet communication is completed, the link partner 10 transmits the buffered skip ordered sets to the link partner 20. In the link partner 10, the encoder 13 encodes the skip data "00111100" with an 8b/10b encoding technique to obtain the first and second skip symbols. Furthermore, the skip data is not scrambled by the scrambler 12 of the link partner 10. Similarly, no skip ordered set is de-scrambled by the de-scrambler 22 of the link partner 20. In addition, the clock difference compensation unit 26 of the link partner 20 may increase or decrease the quantity of the skip ordered sets to avoid asynchronous clocks between the two link partners 10 and 20.

Figure 4:
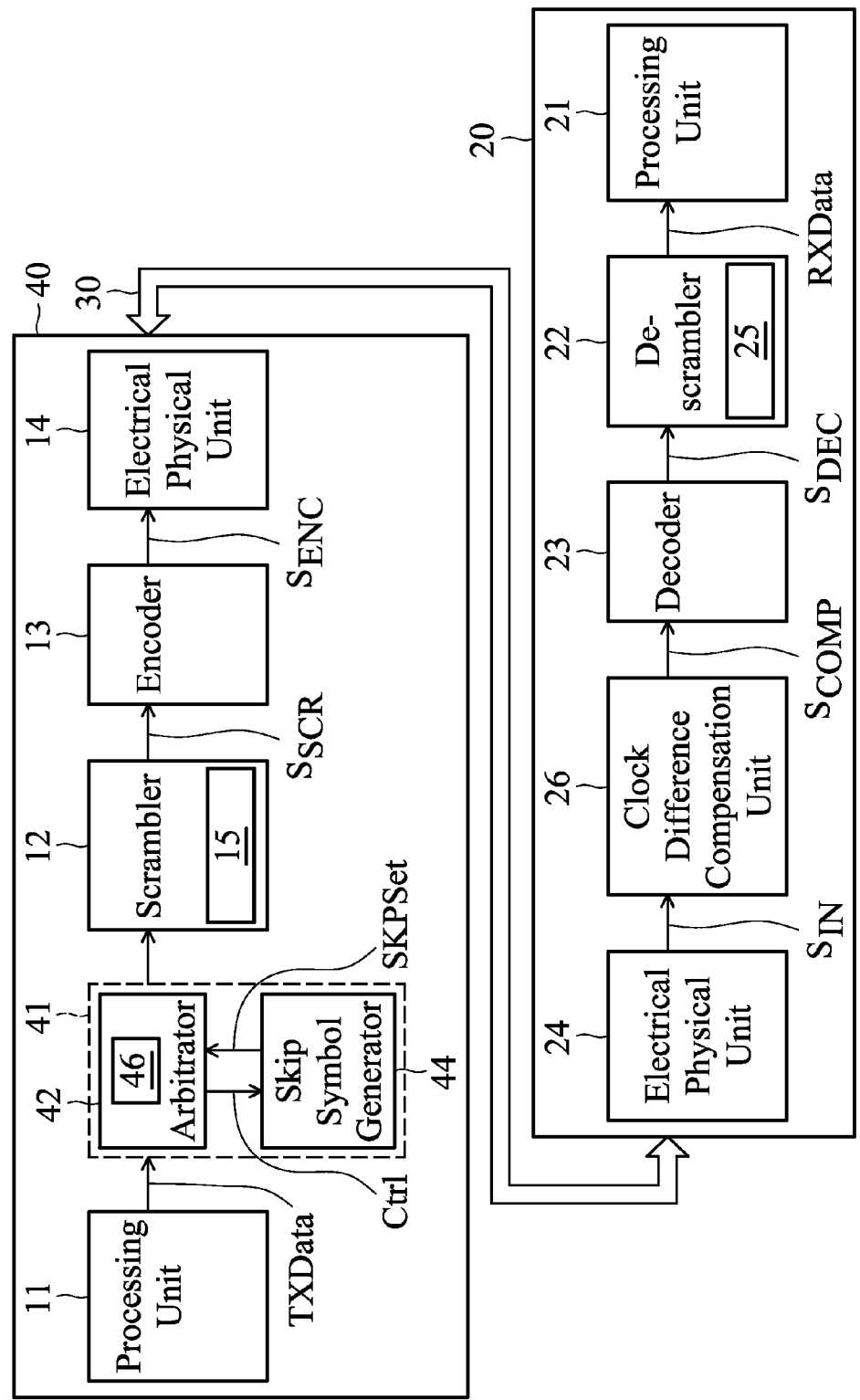
FIG. 4 shows a USB device according to an embodiment of the invention.

FIG. 4 shows a USB device 40 according to an embodiment of the invention. In FIG. 4, the link partner 40 transmits data to the link partner 20 via the cable 30. Compared with the link partner 10 of FIG. 1, the link partner 40 further includes a clock difference compensation unit 41 coupled between the processing unit 11 and the scrambler 12, wherein the clock difference compensation unit 41 includes an arbitrator 42 coupled between the processing unit 11 and the scrambler 12 and a skip symbol generator 44 coupled to the arbitrator 42. When the received data TXData from the processing unit 11 is a packet, the arbitrator 42 first identifies the type of the packet TXData according to a Type field within a header of the packet TXData. Next, when the packet TXData is not a Data Packet, i.e. the packet TXData is a Link Management Packet, a Transaction Packet or a Isochronous Timestamp Packet, the arbitrator 42 directly passes the packet TXData to the scrambler 12 for subsequent processing (such as scrambling, encoding etc.) and then the processed packet is transmitted to the link partner 20 via the cable 30. On the contrary, when the arbitrator 42 identifies the packet TXData as a Data Packet according to the Type Field of the packet TXData (e.g. the field 210 of FIG. 2), the arbitrator 42 stores the packet TXData into a buffer 46 within the arbitrator 42 and obtains a data length of the packet TXData according to a Data Length field of the packet TXData, such as the field 220 of FIG. 2 indicating the number of bytes in the Data Packet Payload. Next, the arbitrator 42 determines whether to generate a control signal Ctrl to the skip symbol generator 44, to control the skip symbol generator 44 to generate at least one skip symbol set SKPSet to the arbitrator 42, wherein each skip symbol set SKPSet includes two skip data "00111100". As described above, a skip ordered set may be obtained by encoding the two skip data "00111100" with an 8b/10b encoding technique. Next, after receiving the skip symbol set SKPSet, the arbitrator 42 transmits the skip symbol set SKPSet to the scrambler 12 in advance and then transmits the packet TXData stored in the buffer 46 to the scrambler 12 for subsequent processing. Finally, the link partner 40 sequentially transmits the skip ordered set and the Packet to the link partner 20 via the cable 30. In another word, the link partner 40 transmits at least one skip ordered set to the link partner 20 prior to a Data Packet, wherein the encoder 13 encodes the skip symbol set SKPSet generated by the skip symbol generator 44 to generate the skip ordered set. In one embodiment, the clock difference compensation unit 41 may be implemented in the processing unit 11.

In FIG. 4, the arbitrator 42 controls a quantity of the skip symbol set SKPSet generated by the skip symbol generator 44 according to the data length of the packet TXData. In one embodiment, the arbitrator 42 may control the skip symbol generator 44 to generate the skip symbol set SKPSet with a fixed quantity according to a predefined data length. For example, if the data length of the packet TXData is larger than or equal to 512 bytes, the arbitrator 42 provides the control signal Ctrl to the skip symbol generator 44, to control the skip symbol generator 44 to generate the skip symbol set SKPSet with a fixed quantity to the arbitrator 42. Furthermore, the arbitrator 42 may also determine the quantity of the skip symbol set SKPSet according to various data lengths, i.e. a quantity of the skip ordered set that is transmitted by the link partner 40 prior to a Data Packet, corresponds to a data length of the Data Packet. FIG. 5 shows a table illustrating a relationship between a data length of a Data Packet and a quantity of the skip ordered set inserted by a skip symbol generator according to an embodiment of the invention. Referring to FIG. 4 and FIG. 5, the arbitrator 42 does not provide the control signal Ctrl to the skip symbol generator 44 when the data length of the Data Packet is between 0 and 511 bytes, thus no skip ordered set is inserted prior to the Data Packet by the link partner 40. When the data length of the Data Packet is between 512 and 767 bytes, the arbitrator 42 provides the control signal Ctrl to the skip symbol generator 44, such that the link partner 40 inserts one skip ordered set prior to the Data Packet. When the data length of the Data Packet is between 768 and 1024 bytes, the arbitrator 42 provides the control signal Ctrl to the skip symbol generator 44, such that the link partner 40 inserts two skip ordered sets prior to the Data Packet. In FIG. 5, the data length range of the Data Packet and the corresponding quantity of the skip ordered set may be adjusted by software according to an actual communication state between the link partner 40 and the link partner 10.

Figure 6:
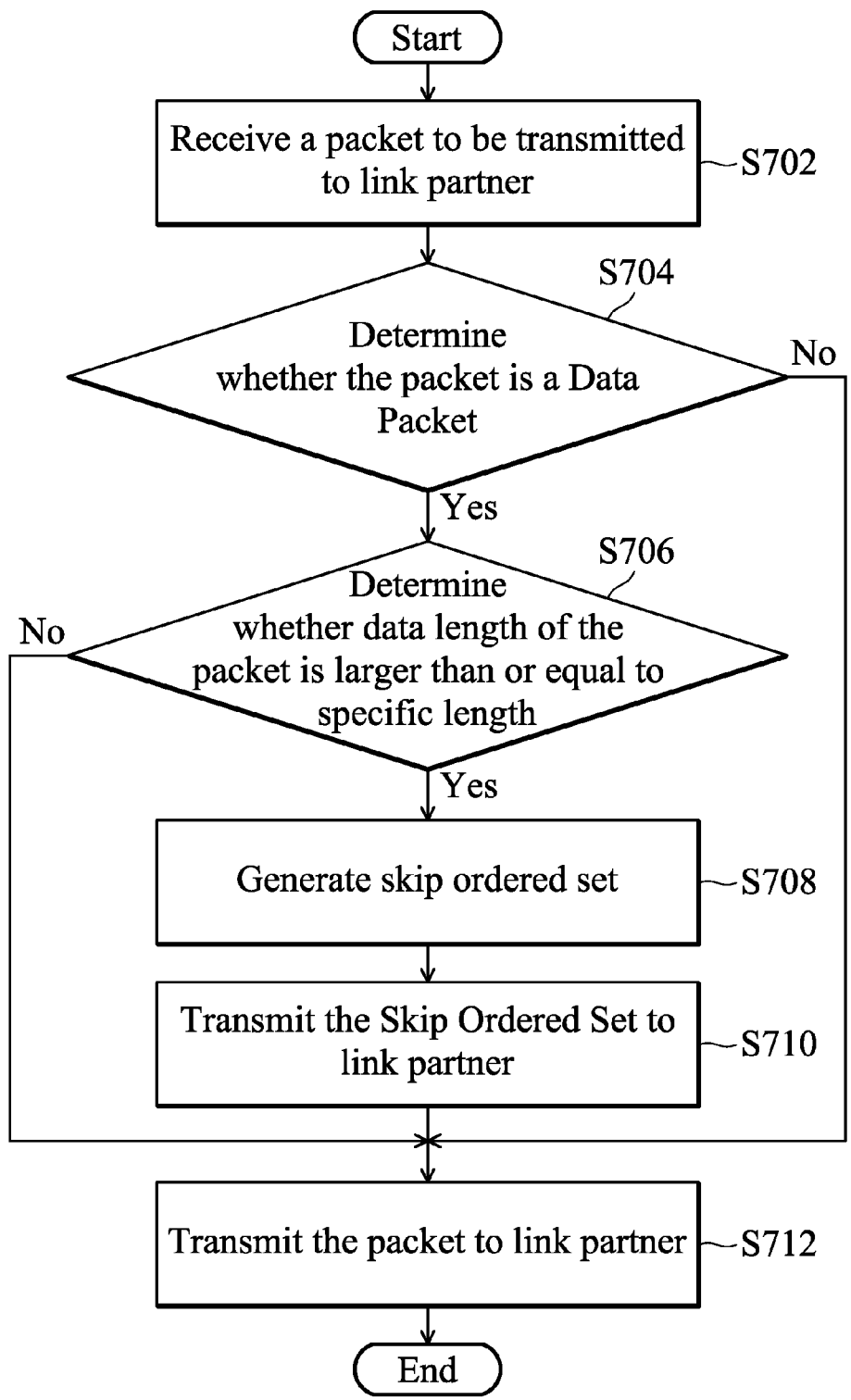
FIG. 6 shows a clock difference compensation method for a USB device capable of providing SuperSpeed data communications according to an embodiment of the invention.

FIG. 6 shows a clock difference compensation method for a USB device capable of providing SuperSpeed data communications according to an embodiment of the invention. First, a packet to be transmitted to a link partner is received (step S702). Next, it is determined whether the packet is a Data Packet according to a Type Field within a header of the packet (step S704). The packet is directly transmitted to the link partner when the packet is not the Data Packet (step S712). On the contrary, when the packet is the Data Packet, it is determined whether a data length of the packet is larger than or equal to a specific length according to a Data Length Field within the header of the packet (step S706). The packet is directly transmitted to the link partner when the data length of the packet is smaller than the specific length (step S712). On the contrary, when the data length of the packet is larger than or equal to the specific length, a quantity of the skip ordered set is determined according to the data length of the packet, and then the skip ordered set with the determined quantity is generated (step S708), wherein the quantity of the skip ordered set may be a fixed value or correspond to the data length of the packet. Next, the skip ordered set with the determined quantity is transmitted to the link partner (step S710). Next, the packet is transmitted to the link partner after the skip ordered set is transmitted (step S712).

A clock difference between a link partner on the transmitting side and a link partner on the receiving side is compensated for by using a clock difference compensation unit in the link partner on the transmitting side according to the embodiments of the invention. In addition, an arbitrator of the clock difference compensation unit may identify whether a packet to be transmitted is a Data Packet or not, and may control a skip symbol generator to generate the skip ordered set or not and determine a quantity of skip ordered sets to be generated according to a data length of the Data Packet. By transmitting the skip order set prior to the Data Packet, data overflow or data underflow may be prevented when the Data Packet is transmitted to the link partner on the receiving side. If data overflow or data underflow occurs, the link partner on the transmitting side is required to re-send the Data Packet to the link partner on the receiving side. Therefore, the clock difference between the link partner on the transmitting side and the link partner on the receiving side is compensated for, which increases transmission efficiency between the two link partners.

In addition to USB 3.0 devices, the invention may also be applied to other series transmission standards or series bus devices, such as a Peripheral Component Interconnect Express (PCIe) standard or other standards like a USB 3.0 or a PCIe protocol. Similarly, by determining whether to transmit specific data (e.g. skip order set) before any Data Packet is transmitted, a clock difference between a device on the transmitting side and a device on the receiving side is compensated for, thus avoiding data overflow or data underflow during data packet transmission from the device on the transmitting side to the device on the receiving side.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A serial bus device for transmitting a packet to a link partner, comprising:
   a processing unit, generating the packet; and
   a clock difference compensation unit coupled to the processing unit, determining whether to transmit at least one skip ordered set to the link partner prior to the packet according to a type of the packet, so as to compensate for a clock difference for the link partner,
   wherein the clock difference compensation unit comprises:
   a skip symbol generator, generating the skip ordered set which comprises two skip symbols; and
   an arbitrator coupled between the processing unit and the skip symbol generator, determining whether to transmit the skip ordered set to the link partner prior to the packet according to the type of the packet.

2. The serial bus device as claimed in claim 1, wherein the arbitrator identifies the type of the packet according to a type field within a header of the packet.

3. The serial bus device as claimed in claim 1, wherein the arbitrator determines whether to transmit the skip ordered set to the link partner prior to the packet according to a data length of the packet when the packet is a data packet.

4. The serial bus device as claimed in claim 1, wherein the arbitrator directly transmits the packet to the link partner when the packet is not a data packet.

5. The serial bus device as claimed in claim 3, wherein the arbitrator transmits the skip ordered set to the link partner prior to the packet when the packet is the data packet and the data length of the packet is larger than or equal to a specific value.

6. The serial bus device as claimed in claim 5, wherein the arbitrator directly transmits the packet to the link partner when the packet is the data packet and the data length of the packet is smaller than the specific value.

7. The serial bus device as claimed in claim 3, wherein the arbitrator obtains the data length of the packet according to a data length field within a header of the packet.

8. The serial bus device as claimed in claim 3, wherein the arbitrator controls the skip symbol generator to generate the skip ordered set when the packet is the data packet and the data length of the packet is larger than or equal to a specific value, and a quantity of the skip ordered set generated by the skip symbol generator corresponds to the data length of the packet.

9. A clock difference compensation method for a serial bus device, comprising:
   determining whether a packet to be transmitted to a link partner is a data packet;
   transmitting at least one skip ordered set to the link partner prior to the packet when the packet is the data packet and a data length of the packet is larger than or equal to a specific value, so as to compensate for a clock difference between the serial bus device and the link partner; and
   directly transmitting the packet to the link partner when the packet is not the data packet.

10. The clock difference compensation method as claimed in claim 9, further comprising:
    directly transmitting the packet to the link partner when the packet is the data packet and the data length of the packet is smaller than the specific value.

11. The clock difference compensation method as claimed in claim 9, further comprising:
   determining a quantity of the skip ordered set to be transmitted to the link partner according to the data length of the packet.

12. The clock difference compensation method as claimed in claim 11, wherein the quantity of the skip ordered set corresponds to the data length of the packet.

13. The clock difference compensation method as claimed in claim 11, wherein the quantity of the skip ordered set is fixed.

14. The clock difference compensation method as claimed in claim 9, wherein the step of determining further comprises:
   determining whether the packet is the data packet according to a type field within a header of the packet; and
   obtaining the data length of the packet according to a data length field within the header of the packet when the packet is the data packet.

15. The clock difference compensation method as claimed in claim 9, wherein the skip ordered set comprises two skip symbols.

* * * * *